No. 765,838. Patented July 26, 1904.

UNITED STATES PATENT OFFICE.

WILLIAM SMITH HORRY, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF SMELTING COMPOUNDS AND PRODUCING CARBIDS.

SPECIFICATION forming part of Letters Patent No. 765,838, dated July 26, 1904.

Application filed April 13, 1904. Serial No. 203,239. (No specimens.)

*To all whom it may concern:*

Be it known that I, WILLIAM SMITH HORRY, a citizen of the United States, residing at Niagara Falls, in the county of Niagara and State of New York, have invented certain new and useful Improvements in Processes of Smelting Compounds and Producing Carbids, of which the following is a specification.

Calcium carbid may be produced by heating a mixture of lime and carbon in an electric furnace employing either a direct or alternating current. In the original work of Thomas L. Willson, at Spray, North Carolina, an electric arc produced by a direct current was employed. This inventor subsequently obtained a patent for the production of carbid by the use of an alternating electric arc—to wit, United States No. 541,137, reissued October 22, 1895, as No. 11,511. This patent states that a current which is reversed about fifty times a second is effective. In the commercial production of carbid at Niagara Falls, New York, a current having a frequency of twenty-five alternations per second has been uniformly employed.

I have discovered that it is not only advantageous to employ an alternating current for the production of carbid, but that the current efficiency is a function of the current frequency. A frequency of twenty-five per second is inferior to that of fifty per second described in Willson's specified patent, a frequency of one hundred and twenty gives a much higher yield than one of fifty, and frequencies which are above one hundred and thirty-three periods, and therefore greater than those given by any commercial machines, may be employed to still greater advantage. I therefore propose to employ an alternating current of the highest frequency which will not cause undue losses by inductive drop in the current mains.

In carrying out the process the charge to be smelted—for example, a mixture of finely-divided lime and carbon—is fed into an electric furnace of any approved type, such as the Horry furnace with a rotating body, and an alternating electric current having a frequency sufficiently high to reduce the losses due to electrolytic decomposition to a practicable minimum is passed through the mixture, heating it to the required temperature.

While the increased production of calcium carbid due to the use of an alternating current of abnormally-high frequency is a fact which I am not fully able to account for by theoretical considerations, I am of the opinion that the molten calcium carbid, as well as calcium oxid, acts as an electrolyte and that a direct current or an alternating current of low frequency electrolytically decomposes both the carbid and oxid, a considerable portion of the electrical energy thus being bound in the products of electrolysis instead of being transformed into useful heat. A current of higher frequency liberates a smaller amount of ions at each reversal, and the anions and cations liberated at the same electrode by the successive current-waves of opposite direction may therefore be assumed to more fully recombine, their chemical energy being thereby transformed into heat of combination. The polarization electromotive force of an electrolyte is in many cases a function of the impressed electromotive force and a quantity which has no definite maximum, and the losses due to partial electrolysis in a calcium-carbid furnace using a current of low frequency are serious on account of the high-potential difference maintained between the electrodes.

While the process has been commercially utilized for the manufacture of calcium carbid, it is obviously useful for the production of other carbids, silicides, &c., and in general for such smelting operations as are effected by heat generated by passing an electric current through the charge and in which electrolysis is undesirable.

I claim—

1. The process of smelting electrolyzable compounds, which consists in heating the charge by passing through it an alternating electric current having a frequency sufficiently high to substantially eliminate losses due to electrolytic decomposition, as set forth.

2. The process of smelting electrolyzable compounds, which consists in heating the charge by passing through it an alternating electric current having a frequency of more than one hundred and thirty-three periods per second, as set forth.

3. The process of smelting electrolyzable compounds, which consists in heating a mixture of the compound and a reducing agent by passing through the mixture an alternating electric current having a frequency sufficiently high to substantially eliminate losses due to electrolytic decomposition, as set forth.

4. The process of smelting electrolyzable compounds, which consists in heating a mixture of the compound and a reducing agent by passing through the mixture an alternating electric current having a frequency of more than one hundred and thirty-three periods per second, as set forth.

5. The process of producing calcium carbid, which consists in heating a mixture of a calcium compound and carbon by passing through the mixture an alternating electric current having a frequency sufficiently high to substantially eliminate losses due to electrolytic decomposition, as set forth.

6. The process of producing calcium carbid, which consists in heating a mixture of a calcium compound and carbon by passing through the mixture an alternating electric current having a frequency of more than one hundred and thirty-three periods per second, as set forth.

In testimony whereof I affix my signature in presence of two witnesses.

WILLIAM SMITH HORRY.

Witnesses:
EUGENE A. BYRNES,
CLINTON P. TOWNSEND.